(No Model.)
J. P. OTTAWAY.
HANDLE BAR JOINT FOR CYCLES.
No. 575,533.　　　　　　　　　　　Patented Jan. 19, 1897.
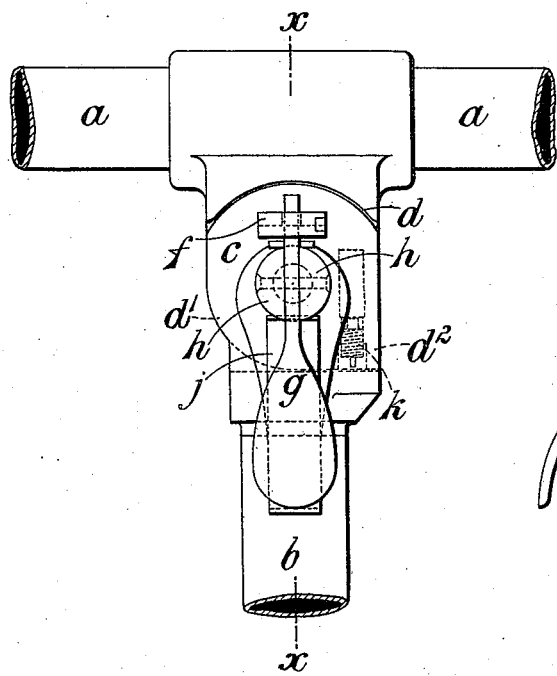
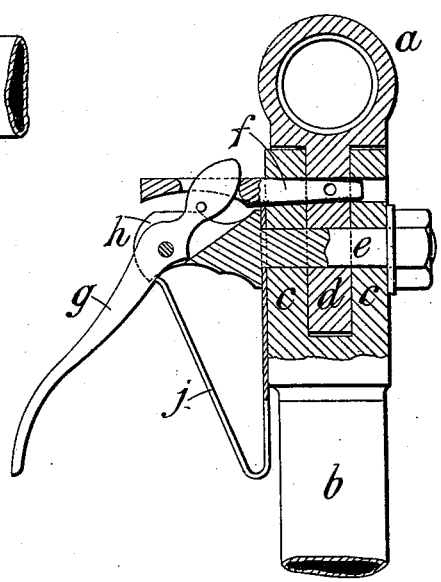
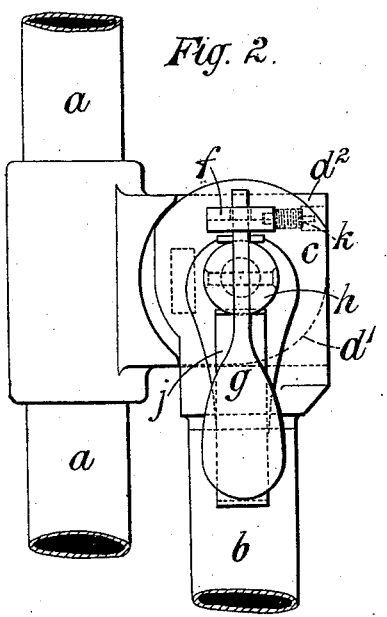
Witnesses,
Thos. A. Gunn
Robert Everett
Inventor:
James Philip Ottaway.
By James L. Norris.
Atty.

UNITED STATES PATENT OFFICE.

JAMES PHILIP OTTAWAY, OF BOURNEMOUTH, ENGLAND, ASSIGNOR TO HENRI NELSON HARNESS, OF LONDON, ENGLAND.

HANDLE-BAR JOINT FOR CYCLES.

SPECIFICATION forming part of Letters Patent No. 575,533, dated January 19, 1897.

Application filed December 28, 1895. Serial No. 573,621. (No model.) Patented in England June 20, 1894, No. 11,931.

*To all whom it may concern:*

Be it known that I, JAMES PHILIP OTTAWAY, butcher, a subject of the Queen of Great Britain, residing at Boscombe, Bournemouth, England, have invented new and useful Improvements in Handle-Bar Joints for Cycles, (for which I have obtained a patent in Great Britain, No. 11,931, bearing date June 20, 1894,) of which the following is a specification.

My invention has for its object to provide for the reduction in width of cycles requisite to enable them to pass through narrow openings or passages or to occupy less room when not in use, my invention allowing of the handles being turned up into a perpendicular position.

Figure 1 is an elevation showing the handle-bar in position for use. Fig. 2 is a similar view showing the handle-bar adjusted to a perpendicular position; and Fig. 3 is a section through the joint on the line $x\,x$, Fig. 1.

My said invention consists partly in the combination, in a velocipede, of an upright or steering bar provided at its upper end with a forked piece having a transverse slot, a handle-bar provided with a lug or tenon having two corresponding slots approximately at right angles to each other and fitting into said fork and connected therewith by a pivot-pin, whereby said handle-bar is adjustable through an angle of about ninety degrees in a plane extending longitudinally through said handle-bar and through the upright or steering bar, a transversely-sliding bolt or wedge working in the transverse slot in the fork and adapted to enter one or other of the slots in the lug or tenon of the handle-bar, and a spring-lever pivoted to the head of said pivot-pin and having an arm engaging in a slot in said bolt or wedge, whereby said handle-bar can be very securely fastened in either of its extreme positions.

My said invention also consists in the combination, with the upright or steering bar having the fork with the transverse slot, the pivoted handle-bar having the slotted lug or tenon, and the transversely-sliding bolt or wedge whereby said handle-bar is fastened in either of its extreme positions, of a locking-screw fitted into a tapped hole in said lug or tenon and engaging said sliding bolt or wedge, whereby said handle-bar can be locked in its inoperative position, so that it cannot be returned to its operative position by unauthorized persons.

The handle-bar $a$ and the upright or steering bar $b$ are formed one with a forked piece $c$ and the other with a lug or tenon $d$ to fit into and work in the said forked piece about a pivot-pin $e$. The said handle-bar is adapted to be secured either in position for use or in its perpendicular position, as may be desired, by means of a self-acting laterally-sliding bolt or wedge $f$, which is adapted to pass into a slot in the forked piece $c$ and into one or the other of two slots in the tenon $d$, as shown in Fig. 1 or in Fig. 2, and which is arranged to be operated by a lever $g$. This lever in the arrangement shown is pivoted to lugs $h$, formed on or attached to one end of the pivot-pin $e$, and is combined with a spring $j$, which tends to hold the bolt or wedge $f$ in its locking position.

When the bolt or wedge $f$ is withdrawn by pressing inward the lever $g$, the handle-bar $a$ can be turned up into the position shown in Fig. 2, so that the handle-bar is perpendicular, the tenon portion $d$ of the joint having one quadrant shoulder $d'$ to allow of its turning, and the other shoulder $d^2$ thereof being square, so as to hold the parts of the joint firmly in position when adjusted for use.

In order that the handle-bar $a$ may be securely locked in its inoperative position, so that only an authorized person can return it to its operative position, I provide a locking-screw $k$, which fits into a tapped hole in the lug or tenon $d$, and when the handle-bar is in its perpendicular position can be screwed in so that it will engage with the sliding bolt or wedge $f$, as shown in Fig. 2, and will thus prevent the withdrawal of said bolt or wedge from the slot in said lug or tenon. As will be seen in Figs. 1 and 2, the said screw $k$ is made with a thin flat head and is let into a recess in said lug or tenon $d$, so that it can only be turned by means of a suitable implement or key which will fit into the said recess and engage with the flat head of the said screw.

The movement of the handle-bar into its operative position can therefore be effected only by a person possessing such a key.

What I claim is—

The combination with the upright or steering bar provided with the fork having the transverse slot, of the pivoted handle-bar provided with the lug or tenon having the two corresponding slots approximately at right angles to each other, the transversely-sliding bolt or wedge working in the slot in said fork and adapted to enter either of the slots in said lug or tenon, and the locking-screw fitted in a tapped hole in said lug or tenon and adapted to engage with said sliding bolt or wedge when the handle-bar is in its perpendicular position, substantially as and for the purposes above specified.

JAMES PHILIP OTTAWAY.

Witnesses:
FREDERICK CHARLES FARRAH,
CHAS. M. BENNETT.